United States Patent
Herskowitz et al.

(10) Patent No.: US 8,142,527 B2
(45) Date of Patent: Mar. 27, 2012

(54) PRODUCTION OF DIESEL FUEL FROM VEGETABLE AND ANIMAL OILS

(75) Inventors: Mordechay Herskowitz, Meitar (IL); Miron Landau, Beer-Sheva (IL); Iehudit Reizner, Lehavim (IL); Mark Kaliya, Beer-Sheva (IL)

(73) Assignee: Ben-Gurion University of the Negev Research and Development Authority, Beer-Sheve (IL)

( * ) Notice: Subject to any disclaimer, the term of this patent is extended or adjusted under 35 U.S.C. 154(b) by 871 days.

(21) Appl. No.: 11/378,322

(22) Filed: Mar. 20, 2006

(65) Prior Publication Data

US 2006/0207166 A1     Sep. 21, 2006

Related U.S. Application Data

(60) Provisional application No. 60/663,203, filed on Mar. 21, 2005.

(51) Int. Cl.
    *C10G 3/00*     (2006.01)
    *C10L 1/04*     (2006.01)

(52) U.S. Cl. ............... 44/605; 44/300; 44/385; 585/14; 585/240; 208/15

(58) Field of Classification Search .............. 44/385, 44/605; 585/14, 240; 208/15
    See application file for complete search history.

(56) References Cited

U.S. PATENT DOCUMENTS

| | | | |
|---|---|---|---|
| 3,744,981 A * | 7/1973 | Ward | ................. 48/197 R |
| 3,950,447 A | 4/1976 | Gryaznov | |
| 4,992,605 A * | 2/1991 | Craig et al. | ................. 585/240 |
| 5,082,986 A | 1/1992 | Miller | |
| 5,135,638 A | 8/1992 | Miller | |
| 5,246,566 A | 9/1993 | Miller | |
| 5,282,958 A | 2/1994 | Santilli et al. | |
| 5,689,031 A | 11/1997 | Berlowitz et al. | |
| 5,705,722 A * | 1/1998 | Monnier et al. | ................. 585/240 |
| 5,723,716 A | 3/1998 | Brandes et al. | |
| 6,232,277 B1 | 5/2001 | Ledeore et al. | |
| 6,399,845 B1 | 6/2002 | Raulo et al. | |

(Continued)

FOREIGN PATENT DOCUMENTS

EP     1396531 A2     3/2004

(Continued)

OTHER PUBLICATIONS

Ferrari, M. et al., Upgrading of Bio-Fuels by Catalytic Hydrotreatment: Hydrodeoxygenation Reaction. The Study of Carbon as an Alternative Support to Replace Alumina), Symposium on Recent Advances in Heteroatom Removal Presented Before the Division of Petroleum Chemistry, Inc. 215th National Meeting, American Chemical Society, Dallas, TX, Mar. 29-Apr. 3, 1998, 43(1), 94-98.

(Continued)

*Primary Examiner* — Ellen McAvoy
*Assistant Examiner* — Ming Cheung Po
(74) *Attorney, Agent, or Firm* — Merchant & Gould

(57) ABSTRACT

A process for producing a fuel composition from vegetable and/or animal oil comprises hydrodeoxygenating and hydroisomerizing the oil in a single step. The fuel composition has acceptable lubricity and comprises a mixture of $C_{14}$ to $C_{18}$ paraffins having a ratio of iso to normal paraffins of 2 to 8 and less than 5 ppm sulfur.

29 Claims, 1 Drawing Sheet

U.S. PATENT DOCUMENTS

| | | | |
|---|---|---|---|
| 6,458,265 | B1 | 10/2002 | Miller et al. |
| 6,702,937 | B2 | 3/2004 | Johnson et al. |
| 6,962,651 | B2 | 11/2005 | Miller et al. |
| 7,150,823 | B2 | 12/2006 | Mayer et al. |
| 7,160,339 | B2 | 1/2007 | Jordan |
| 7,179,311 | B2 | 2/2007 | O'Rear et al. |
| 7,232,935 | B2 * | 6/2007 | Jakkula et al. ............... 585/240 |
| 2002/0062055 | A1 * | 5/2002 | Raulo et al. ............... 585/739 |
| 2002/0128331 | A1 * | 9/2002 | Rosenbaum et al. ......... 518/728 |
| 2003/0057135 | A1 * | 3/2003 | Benazzi et al. ............... 208/57 |
| 2004/0055209 | A1 | 3/2004 | Jakkula et al. |
| 2004/0230085 | A1 * | 11/2004 | Jakkula et al. ............... 585/240 |
| 2004/0250466 | A1 | 12/2004 | Fang et al. |
| 2005/0011112 | A1 | 1/2005 | Khalil et al. |
| 2005/0023188 | A1 | 2/2005 | Connor |
| 2005/0027148 | A1 | 2/2005 | Connor |
| 2007/0010682 | A1 | 1/2007 | Myllyoja et al. |

FOREIGN PATENT DOCUMENTS

| | | |
|---|---|---|
| EP | 1398364 A1 | 3/2004 |
| GB | 1524781 | 9/1978 |
| WO | WO 98/56876 | 12/1998 |
| WO | WO 03/035585 A1 | 5/2003 |
| WO | WO 2004/022674 A1 | 3/2004 |
| WO | WO 2004/078644 A1 | 9/2004 |
| WO | WO 2004/078646 A1 | 9/2004 |
| WO | WO 2004/113474 A2 | 12/2004 |
| WO | WO 2005/001002 A2 | 1/2005 |
| WO | WO 2005/014765 A1 | 2/2005 |
| WO | WO 2005/030911 A2 | 4/2005 |

OTHER PUBLICATIONS

Gusmao, J. et al. "Utilization of Vegetable Oils as an Alternative Source for Diesel-Type Fuel: Hydrocracking on Reduced Ni/SiO$_2$ and Sulphided Ni-Mo/γ-Al$_2$O$_3$," *Catalysis Today*, 5(1989) 533-544, Elsevier Science Publishers B.V., Amsterdam, The Netherlands.

Hershkowitz, F. et al., "A Breakthrough Process for the Production of Hydrogen," AIChE Annual Meeting, Nov. 2004 (7 pages).

Hershkowitz, F., et al. "Hydrogen Production via Stem Reforming in a Reverse-Flow Reaction,", AIChE Annual Meeting, Nov. 2005 New York, New York (5 pages).

Hughes, J.M. et al., "The Relationship between the Base Extractable Species Found in Middle Distillate Fuel and Lubricity," *Energy & Fuels*, 17 (2003), 444-449, American Chemical Society.

Khalip, A., "Petrobras Pioneers Vegoil Diesel Mix Technology," Reuters News Article (May 19, 2006) 2 pgs.

Kleinschek, G., "Emission Tests with Synthetic Diesel Fuels (GTL & BTL) with a Modern Euro 4 (EGR) Engine".

Knothe, G. et al., "Lubricity of Components of Biodiesel and Petrodiesel. The Origin of Biodesel Lubricity," *Energy & Fuels* (2005) 19, 1192-1200.

Marcilly, C.R., "Where and How Shape Selectivity of Molecular Sieves Operates in Refining and Petrochemistry Catalytic Processes," *Topics in Catalysis* 13 (2000) 357-366.

Minami, I., "Synergistic Effect of Antiwear Additives and Antioxidants in Vegetable Oil," *J. Synthetic Lubrication*, 21-3 (Oct. 2004) 193-205.

da Rocha, G.N. et al., "Catalytic Conversion of *Hevea brasiliensis* and *Virola sebifera* Oils to Hydrocarbon Fuels," *JAOCS*, 69 (3) (Mar. 1992) 266-271.

da Rocha, G.N. et al., "Formation of Alkanes, Alkylcycloalkanes and Alkylbenzenes Durign the Catalytic Hydrocracking of Vegetable Oils,", *Fuel* (1993) 72(4), 543-549.

Sharma, R.K. et al., "Conversion of Fatty Acids and Esters to Low-Aromatic Gasoline," American Chemical Society, Division of Fuel Chemistry (1994), 39(4), 1040-2.

Stumborg, M. et al, "Hydroprocessed Vegetable Oils for Diesel Fuel Improvement," *Bioresource Technology* 56 (1996) 13-18, Elsevier Science Limited, Great Britain.

ASTM D 975-05: Standard Specification for Diesel Fuel Oils.

ASTM D 6584-00: Standard Test Method for Determination of Free and Total Glycerin in B-100 Biodiesel Methyl Esters by Gas Chromatography.

ASTM D 6751-03a: Standard Specification for Biodiesel Fuel Blend Stock (B100) for Middle Distillate Fuels.

ASTM D 6920-03: Standard Test Method for Total Sulfur in Naphthas, Distillates, Reformulated Gasolines, Diesels, Biodiesels, and Motor Fuels by Oxidative Combusion and Electrochemical Detection.

World-Wide Fuels Harmonisation, (Dec. 2002) World-Wide Fuel Charter, 1-49.

Van Gerpen, J.H., Combustion and Emissions from Biodiesel Fuels, (Oct. 26-29, 2003) Fall 2003 Technical Meeting of Eastern States Section of the Combustion Institute.

R. Linnaila, "Status of Neste Oil's Biobased NExBTL Diesel Production for 2007," Neste Oil, Finland, Synbios, Stockholm, (May 19, 2005) 1-30.

Aakko, P. et al., NExBTL—Biodiesel Fuel of the Second Generation, presented at the SAE Powertrain & Fluid Systems Conference, San Antonio, TX (Oct. 25, 2005), Technical Research Centre of Finland, (VTT), Neste Oil Corporation, 1-29.

Rahkamo, K., "Biofuels Markets Conference," Brussels (Feb. 7, 2006), Neste Oil Corporation 1-12.

International Search Report and Written Opinion issued in corresponding PCT/IB06/00671 on Jun. 4, 2007.

Michael J. McCall et al., "Opportunities for Biorenewables in Petroleum Refineries", UOP 4434A, 2005 UOP LLC.

European Search Report dated Dec. 8, 2011 (3 pages).

* cited by examiner

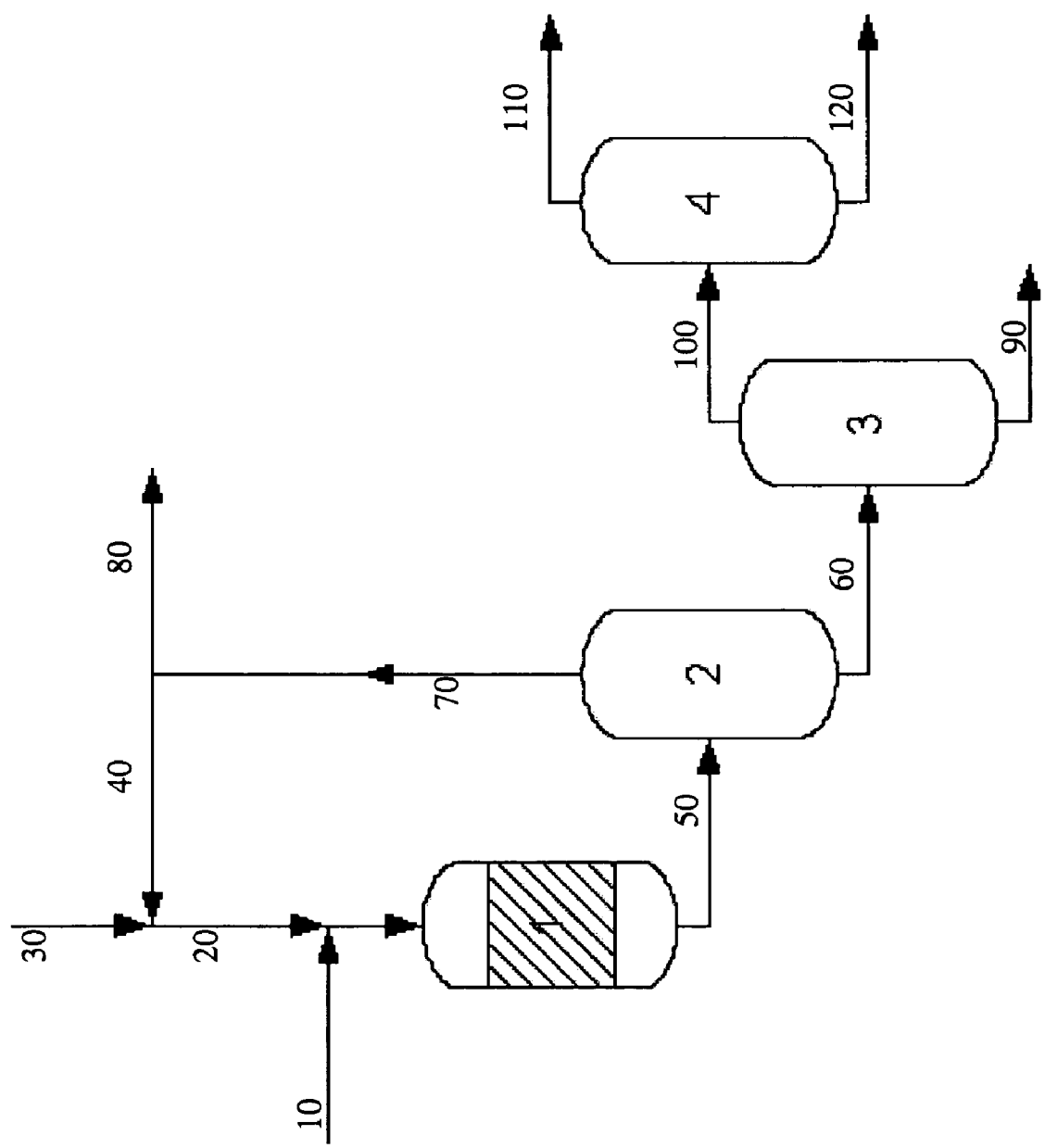

PRODUCTION OF DIESEL FUEL FROM VEGETABLE AND ANIMAL OILS

RELATED APPLICATION

This application claims priority under 35 U.S.C. §119 to U.S. Provisional Application No. 60/663,203 entitled PRODUCTION OF DIESEL FUEL FROM VEGETABLE AND ANIMAL OILS and filed on Mar. 21, 2005, the entire content of which is hereby incorporated by reference.

BACKGROUND OF THE INVENTION

1. Field of the Invention

The present invention relates to the production of liquid fuels, particularly diesel and naphtha fuels, from vegetable and/or animal oils.

2. Description of the Related Art

Most combustible liquid fuels used for on road, off road, stationary engines, and combustion turbines and boilers in the world today are derived from crude oil. However, there are several limitations to using crude oil as a fuel source. For example, crude oil is in limited supply, includes a high content of aromatics, and contains sulfur and nitrogen-containing compounds that can adversely affect the environment. There is a great desire and need in the industry to provide combustible liquid fuels that are more environmentally friendly, display good engine performance, and which are available from alternative sources that are abundantly renewable.

Vegetable and animal oils are an abundant and renewable source. The use of vegetable oil in diesel engines requires significant engine modification, including changing of piping and injector construction materials, otherwise engine running times are decreased, maintenance costs are increased due to higher wear, and the danger of engine failure is increased. The current conversion of vegetable and animal oils to combustible liquid fuels typically involves transesterification of the oils, which are triglycerides of $C_{14}$ to $C_{22}$ straight-chain carboxylic acids, with a lower alcohol such as methanol or ethanol, to form a mixture of methyl or ethyl esters called "biodiesel". This process is relatively complex, typical of the chemical industry rather than the petrochemical industry. Furthermore, the composition of biodiesel, which is completely different from that of diesel produced from crude oil, may have adverse effects on engine performance. Biodiesel exhibits poor low temperature performance characteristics and increased nitrogen oxide ($NO_x$) emissions compared to conventional fuels derived from crude oil.

In the search for alternative and renewable sources, there is increasing interest in producing liquid fuels from biological raw materials for use as fuel by themselves or in mixture with the petroleum-derived fuels in use today. The patent literature describes methods for producing hydrocarbon mixtures from biological sources, including vegetable oils.

United Kingdom Patent Specification 1 524 781 discloses converting ester-containing vegetable oils into one or more hydrocarbons by pyrolysis at 300 to 700° C. in the presence of a catalyst which comprises silica-alumina in admixture with an oxide of a transition metal of Groups IIA, IIIA, IVA, VA, VIA, VIIA or VIII of the periodic table, preferably in a fluidized bed, moving bed or fixed bed tubular reactor at atmospheric pressure.

U.S. Pat. No. 5,705,722 discloses a process for producing additives for diesel fuels having high cetane numbers and serving as fuel ignition improvers. In the process, biomass feedstock selected from (a) tall oil containing less than 0.5 wt % ash, less than 25 wt % unsaponifiables, up to 50 wt % diterpenic acids and 30 to 60 wt % unsaturated fatty acids, (b) wood oils from the pulping of hardwood species, (c) animal fats and (d) blends of said tall oil with plant or vegetable oil containing substantial amounts of unsaturated fatty acids or animal fats, is subjected to hydroprocessing by contacting the feedstock with gaseous hydrogen under hydroprocessing conditions in the presence of a hydroprocessing catalyst to obtain a product mixture. This product mixture is then separated and fractionated to obtain a hydrocarbon product boiling in the diesel fuel boiling range, this product being the high cetane number additive.

U.S. Patent Publication No. 2004/0055209 discloses a fuel composition for diesel engines comprising 0.1-99% by weight of a component or a mixture of components produced from biological raw material originating from plants and/or animals and/or fish and 0-20% of components containing oxygen. Both components are mixed with diesel components based on crude oil and/or fractions from Fischer-Tropsch process.

U.S. Patent Publication No. 2004/0230085 discloses a process for producing a hydrocarbon component of biological origin comprising at least two steps, the first one of which is a hydrodeoxygenation step and the second one is an isomerization step operated using the counter-current flow principle. A biological raw material containing fatty acids and/or fatty acid esters serves as the feed stock.

Fuel properties important for potential diesel applications include: (i) lubricity; (ii) cetane number; (iii) density; (iv) viscosity; (v) lower heating value; (vi) sulfur; (vii) flash point; (viii) cloud point; (ix) Distillation Curve; (x) carbon residue; (xi) ash; and (xii) Iodine Value. Lubricity affects the wear of pumps and injection systems. Lubricity can be defined as the property of a lubricant that causes a difference in friction under conditions of boundary lubrication when all the known factor except the lubricant itself are the same; thus, the lower the friction, the higher the lubricity. Cetane number rates the ignition quality of diesel fuels. Density, normally expressed as specific gravity, is defined as the ratio of the mass of a volume of the fuel to the mass of the same volume of water. Viscosity measures the fluid resistance to flow. Lower heating value is a measure of available energy in the fuel. Flash point is the lowest temperature at which a combustible mixture can be formed above the liquid fuel. Cloud point measures the first appearance of wax. Distillation Curve is characterized by the initial temperature at which the first drop of liquid leaves the condenser and subsequent temperatures at each 10 vol % of the liquid. Carbon residue correlates with the amount of carbonaceous deposits in a combustion chamber. Ash refers to extraneous solids that reside after combustion. Iodine Value measures the number of double bonds.

A comparison of properties of biodiesel and EN standard EN590:2005 diesel can be found in Table 1.

TABLE 1

| Fuel Property | Biodiesel | EN590 Diesel |
|---|---|---|
| Density @ 15° C., kg/m³ | ≈885 | ≈835 |
| Viscosity @ 40° C., mm²/s | ≈4.5 | ≈3.5 |
| Cetane Number | ≈51 | ≈53 |
| 90 vol % Distillation, ° C. | ≈355 | ≈350 |
| Cloud Point, ° C. | ≈−5 | ≈−5 |
| Lower Heating Value, MJ/kg | ≈38 | ≈43 |
| Lower Heating Value, MJ/liters | ≈34 | ≈36 |
| Polyaromatics, wt % | 0 | ≈4 |
| Oxygen, wt % | ≈11 | 0 |
| Sulfur, mg/kg | <10 | <10 |

The American Society for Testing and Materials (ASTM) standards for commercial diesel (ASTM D975) and biodiesel (ASTM D6751) can be found in Table 2.

TABLE 2

| Fuel Property | Diesel ASTM D975 | Biodiesel ASTM D6751 |
|---|---|---|
| Lower Heating Value, BTU/gal | 129,050 | 118,170 |
| Kinematic Viscosity @ 40° C., cSt | 1.3-4.1 | 4.0-6.0 |
| Specific Gravity @ 60° C., g/cm$^3$ | 0.85 | 0.88 |
| Carbon, wt % | 87 | 77 |
| Hydrogen, wt % | 13 | 12 |
| Oxygen, by dif. wt % | 0 | 11 |
| Sulfur, ppm | 500 | 0 |
| Boiling Point, ° C. | 180 to 340 | 315 to 350 |
| Flash Point, ° C. | 60 to 80 | 100 to 170 |
| Cloud Point, ° C. | ~15 to 5 | ~3 to 12 |
| Pour Point, ° C. | ~35 to ~15 | ~15 to 10 |
| Cetane Number | 40-55 | 48-65 |
| Lubricity (HFRR), μm | 300-600 | <300 |

There remains a need for alternative processes for conversion of vegetable and animal oils to fuels and diesel fuel compositions derived from vegetable and animal oils having better and more acceptable properties.

SUMMARY OF THE INVENTION

Provided is a process for producing a liquid fuel composition comprising providing oil selected from the group consisting of vegetable oil, animal oil, and mixtures thereof and hydrodeoxygenating and hydroisomerizing the oil in a single step.

Further provided is an integrated process for producing a liquid fuel composition comprising: hydrodeoxygenating and hydroisomerizing oil selected from the group consisting of vegetable oil, animal oil, and mixtures thereof, to produce a liquid fuel composition and gaseous by-products, in a single step in a single reactor; separating the liquid fuel composition and gaseous by-products; separating hydrogen from the gaseous by-products; and recycling the hydrogen to the single reactor.

Additionally provided is a diesel fuel composition derived from oil selected from the group consisting of vegetable oil, animal oil, and mixtures thereof, the composition comprising a mixture of $C_{14}$ to $C_{18}$ paraffins having a ratio of iso to normal paraffins of 2 to 8; less than 5 ppm sulfur; and acceptable lubricity.

SUMMARY OF THE FIGURE OF THE DRAWING

The FIGURE depicts an exemplary process schematic, wherein hydrogen produced in situ is recycled to the process reactor.

DETAILED DESCRIPTION OF THE PREFERRED EMBODIMENTS OF THE INVENTION

It has been surprisingly discovered that high quality liquid fuels, in particular diesel and naphtha fuels, can be obtained from vegetable and/or animal oils in high yield by a one-step process. The products are produced by a single-step hydrodeoxygenation/hydroisomerization of vegetable and/or animal oil. Triglycerides of fatty acids contained in the vegetable and/or animal oil are deoxygenated to form normal $C_{14}$ to $C_{18}$ paraffins, which are hydroisomerized in the same stage to form various isoparaffins. Minor cyclization and aromatization to alkyl cyclohexane and alkyl benzene may also occur. The deoxygenation preferably comprises removal of oxygen in the form of water and carbon oxides from the triglycerides. Hydrocracking is inhibited, so as to maintain the range of carbon number of hydrocarbons formed in the range of $C_{14}$ to $C_{18}$. Thus, as used herein, the phrase "hydrodeoxygenation/hydroisomerization" refers to a single process step wherein both hydrodeoxygenation and hydroisomerization are effected.

Hydrodeoxygenation of vegetable and/or animal oils alone would generate a mixture of long-chain straight $C_{14}$ to $C_{18}$ paraffins. While such long-chain straight $C_{14}$ to $C_{18}$ paraffins would be in the paraffin carbon number range of diesel fuels, the fuel properties of such long-chain straight $C_{14}$ to $C_{18}$ paraffins would be significantly different from those of diesel fuels. Therefore, production of diesel fuel requires hydroisomerization of the paraffins. Accordingly, the presently disclosed process for producing a liquid fuel composition comprises providing oil selected from the group consisting of vegetable oil, animal oil, and mixtures thereof and hydrodeoxygenating and hydroisomerizing the oil in a single step. In addition to hydrocarbon products within the diesel boiling range, the liquid fuel composition produced by the presently disclosed process may further comprise 2-10% lighter naphtha products boiling below 150° C. as well as heavier distillate products.

Hydroisomerization processes are often carried out in fixed bed reactors with downflow of liquid and gas. The reactors may be packed with several beds in series with intermittent quenching of the liquid to control the temperature of the reactor, as hydroisomerization processes are highly exothermic reactions, and redistribution. Preferably, the process disclosed herein is carried out in a fixed-bed reactor, preferably a trickle-bed reactor operated with gas and liquid running downflow. The reactor preferably contains a number of tubes packed with catalyst and located in a shell. Alternative possible configurations include a tube packed with several beds of catalyst(s) and having a quench capability between the beds and an adiabatic reactor. While the reactor may contain a single catalyst or more than one catalyst, preferably the reactor contains a single catalyst.

Preferred catalysts for the presently disclosed process are dual-functional catalysts comprising a metal component and an acidic component. Preferred metal components are platinum or palladium, with platinum being preferred. The acidic component preferably comprises an acidic function in a porous solid support. Preferred acidic components include, for example, amorphous silica aluminas, fluorided alumina, ZSM-12, ZSM-21, ZSM-22, ZSM-23, ZSM-35, ZSM-38, ZSM-48, ZSM-57, SSZ-32, ferrierite, SAPO-11, SAPO-31, SAPO-41, MAPO-11, MAPO-31, Y zeolite, L zeolite and Beta zeolite. A preferred catalyst is Pt/SAPO-11, specifically 1 wt % Pt/SAPO-11.

The type and content of metal, acid strength, type and concentration of acid sites, solid porosity and pore size affect the type and quality of the diesel fuel produced. U.S. Pat. Nos. 5,082,986, 5,135,638, 5,246,566, 5,282,958, and 5,723,716, the entire contents of which are hereby incorporated by reference, disclose representative process conditions using said catalysts for isomerization of different hydrocarbon feedstock. Further, typical processes and catalysts for dewaxing and hydroisomerization are described, for example, in U.S. Pat. No. 6,702,937, the entire content of which is hereby incorporated by reference, and the references cited therein.

The process is carried out at relatively mild conditions, for example, at an LHSV in the range of 0.5-5 h$^{-1}$, preferably 0.6-3 h$^{-1}$, more preferably 0.7-1.2 h$^{-1}$, and even more preferably 0.8-1.2 h$^{-1}$, at a temperature in the range of 300-450° C., preferably 350-420° C., more preferably 370-410° C., at a pressure of 10-60 atm, preferably 20-40 atm, and a H$_2$/oil ratio of about 500-2000 NL/L, preferably 800-1200 NL/L. More severe conditions result in liquid fuel compositions with poorer lubricity, while more moderate to mild conditions result in liquid fuel compositions with better lubricity.

Lubricity is especially important with regard to modern diesel fuels, as modern engines have very high injection pressures in excess of 24,000 pounds per square inch. Good lubricity is necessary to prevent risk of catastrophic engine failure. In general, an acceptable lubricity refers to a lubricity that would allow modern engines to operate more efficiently. Preferably, the diesel fuel has a maximum high-frequency reciprocating rig (HRFF) lubricity of 400 µm (according to International Organization for Standardization (ISO) standard 12156/1), in accordance with the recommendation of the World Wide Fuel Charter, Category 4. More preferably, the lubricity is less than 300 µm according to ISO 12156/1, and even more preferably, the lubricity is less than 200 µm according to ISO 12156/1.

Any vegetable and/or animal oil can be used in the presently disclosed process. For example, suitable vegetable oils include soybean oil, palm oil, corn oil, sunflower oil, oils from desertic plants such as, for example, jatropha oil and balanites oil, rapeseed oil, colza oil, canola oil, tall oil, safflower oil, hempseed oil, olive oil, linseed oil, mustard oil, peanut oil, castor oil, coconut oil, and mixtures thereof. Preferred vegetable oils include soybean oil, palm oil, corn oil, sunflower oil, jatropha oil, balanites oil, preferably from *Balanites aegyptiaca*, and mixtures thereof. The vegetable oil may be genetically modified oil, produced from transgenic crops. The vegetable oil may be crude vegetable oil or refined or edible vegetable oil. If crude vegetable oil is used, preferably the vegetable oil is pretreated, for example, to separate or extract impurities from the crude vegetable oil. Suitable animal oils include, for example, lard oil, tallow oil, train oil, fish oil, and mixtures thereof. Further, the vegetable and/or animal oil may be new oil, used oil, waste oil, or mixtures thereof.

The FIGURE depicts an exemplary process schematic. The vegetable and/or animal oil 10 fed to a fixed-bed hydrodeoxygenation/hydroisomerization reactor 1 with a hydrogen stream 20. The hydrogen stream 20 may be comprised of fresh hydrogen 30 as well as recycled hydrogen 40. The reactor 1 could be wall-cooled, multi-bed with interim cooling, or an adiabatic configuration. The effluent 50 from the reactor 1 flows to a first high pressure separator 2 that separates the liquid products 60 and gas 70 containing hydrogen and light components ($C_1$ to $C_4$ hydrocarbons and carbon oxides). Hydrogen 40, separated from the light components 80 by a selective membrane or a pressure swing absorption unit (not shown), may be recycled back to the reactor 1. The liquid products 60, containing two phases, an organic phase and water, enters a second separator 3 that separates the water 90, and the organic phase 100 is fed to a third separator 4 for separating the lighter components 110 and the $C_{14}$ to $C_{18}$ paraffin products. The lighter components 110 may comprise a naphtha composition of a mixture of $C_6$ to $C_{13}$ paraffins, aromatics and naphthenes with a boiling point of <150° C.

Thus, hydrogen separated from the effluent from the hydrodeoxygenation/hydroisomerization reactions may supplement hydrogen provided for use in the hydrodeoxygenation/hydroisomerization reaction, which preferably is produced using a renewable source of power, such as, for example, solar, biomass, wind, and geothermal (e.g., electrolysis using geothermal energy). Alternatively, or additionally, hydrogen produced by steam reforming of the naphtha may be used in the hydrodeoxygenation/hydroisomerization reaction. By using hydrogen produced in situ, the need for expensive separation processes or separate hydrogen production facilities to supply needed hydrogen is diminished, thereby providing significant cost savings. The integrated process preferably optimizes the utilization of feedstock and reduces by-products that otherwise would require treatment. Use of hydrogen produced in situ reduces the overall environmental burden of the presently disclosed process by decreasing required process resource inputs, specifically hydrogen. Thus, use of energy efficient and environmentally friendly means for hydrogen production is preferred.

Accordingly, also provided is an integrated process for producing a liquid fuel composition comprising: hydrodeoxygenating and hydroisomerizing oil selected from the group consisting of vegetable oil, animal oil, and mixtures thereof, to produce a liquid fuel composition and gaseous by-products, in a single step in a single reactor; separating the liquid fuel composition from gaseous by-products; separating hydrogen from the gaseous by-products; and recycling the hydrogen to the single reactor.

The presently disclosed diesel fuel composition derived from vegetable and/or animal oil comprises a mixture of $C_{14}$ to $C_{18}$ paraffins with a ratio of iso to normal paraffins from 0.5 to 8, preferably from 2 to 8, such as, for example, from 2 to 6 or from 2 to 4 or from 4 to 7; less than 5 ppm sulfur, preferably less than 1 ppm sulfur; and acceptable lubricity. Specifically, the diesel fuel composition preferably has a lubricity of less than 400 µm, more preferably less than 300 µm, and even more preferably less than 200 µm, according to ISO 12156/1.

The diesel fuel composition preferably comprises less than or equal to 0.6 wt %, preferably 0.1-0.6 wt %, of one or more oxygenated compounds, which, without wishing to be bound by any theory, are believed to contribute to the acceptable lubricity of the diesel fuel composition. Preferably, the one or more oxygenated compounds comprise acid, preferably one or more fatty acids, preferably in an amount of less than or equal to 0.4 wt %, preferably 0.1-0.4 wt %. As used herein, the phrase "fatty acids" refers to long chain saturated and/or unsaturated organic acids having at least 8 carbon atoms, preferably 14 to 18 carbon atoms. Without wishing to be bound by any theory, it is believed that the low content of one or more oxygenated compounds, preferably one or more fatty acids, in the diesel fuel composition may contribute to the acceptable lubricity of a diesel fuel composition; such oxygenated compounds, present in the vegetable and/or animal oil feedstock, may survive the non-severe hydrodeoxygenation/hydroisomerization conditions employed in the presently disclosed process. The diesel fuel composition may comprise alkyl cyclohexane, preferably less than 10 wt % and/or alkyl benzene, preferably less than 15 wt %.

The composition and characteristics of the produced diesel fuel composition, and naphtha, may vary depending on the vegetable and/or animal oil starting product, process conditions, and catalyst used. Preferably, selection of vegetable and/or animal oil starting product, process conditions, and catalyst allows for high yield of high quality diesel fuel composition, with preferred properties, and minimized production of lighter components including, for example, naphtha, carbon oxides and $C_1$ to $C_4$ hydrocarbons. The paraffinic diesel fuel compositions disclosed herein provide superior fuel properties, especially for low temperature performance (e.g., density, viscosity, cetane number, lower heating value, cloud point, and CFPP), to biodiesel, a mixture of methyl or ethyl esters. In contrast to the products of the process disclosed in U.S. Patent Publication No. 2004/0230085, disclosed herein are diesel fuel compositions with acceptable lubricities produced from vegetable and/or animal oil. More specifically, fuel properties, such as, for example, lubricity, may be controlled through variation of hydrodeoxygenation/hydroisomerization conditions and/or catalyst(s). In general, with regards to the distillation curve of the produced diesel fuel composition, the initial boiling point (IBP) is in the range of 160° C.-240° C. and the 90 vol % distillation temperature is in the range of 300° C.-360° C. The produced naphtha is highly pure and particularly suitable for use as a solvent and/or chemical feedstock, e.g., a cracking stock.

While the diesel fuel composition disclosed herein preferably may be used neat, as a diesel fuel without blending, the diesel fuel composition disclosed herein may be blended with crude oil, synthetic fuel, and/or biodiesel to provide a blended fuel composition, preferably to be used as a diesel fuel.

EXAMPLES

The following examples are intended to be non-limiting and merely illustrative.

Comparative Example 1

Production of Diesel from Soybean Oil Based on U.S. Patent Publication No. 2004/0230085

Refined soybean oil was fed to a fixed-bed reactor packed with a granulated Ni—Mo catalyst operated at an LHSV of 1.0 h$^{-1}$, 375° C., 40 atm, and an H$_2$/oil ratio of 1200 NL/L (Stage 1). The total liquid product was separated into two phases, water and an organic phase. The organic phase was fed to a fixed-bed reactor packed with a granulated 1 wt % Pt/SAPO-11 catalyst operated at an LHSV of 3.0 h$^{-1}$, 380° C., 50 atm, and an H$_2$/oil ratio of 500 NL/L (Stage 2). The organic phase from Stage 1 and the diesel product from Stage 2 were analyzed according to ASTM methods and their compositions were measured by GC-MS and confirmed by NMR. The results can be found in Table 3.

TABLE 3

| | Comparative Example 1 Stage 1 | Comparative Example 1 Stage 2 |
|---|---|---|
| Oil | Soybean | Soybean |
| Temperature | 375° C. | 380° C. |
| Catalyst | Granulated Ni—Mo | Granulated 1 wt % Pt/SAPO-11 |
| LHSV, hr$^{-1}$ | 1.0 | 3.0 |
| Pressure, atm | 40 | 50 |
| H$_2$/oil ratio, NL/L | 1200 | 500 |
| Distillation Temperature ASTM D86 | | |
| IBP | 194.1° C. | 150° C. |
| 10% | 292.8° C. | 191.1° C. |
| 50% | 303.6° C. | 295.4° C. |
| 90% | 369.0° C. | 356.0° C. |
| Up to 250° C. | 2.0% | 18.1% |
| Up to 350° C. | 86.5% | 89.4% |
| Cold Filter Plugging Point (CFPP) | | |
| IP 309 | 17° C. | <−20° C. |
| Lubricity (HFRR) | | |
| ISO 12156/1 | 352 μm | 502 μm |
| Cloud Point | | |
| ASTM D2500 | 17° C. | <−20° C. |

TABLE 3-continued

| | Comparative Example 1 Stage 1 | Comparative Example 1 Stage 2 |
|---|---|---|
| Kinematic Viscosity @ 40° C. | | |
| ASTM D445 | 5.25 cSt | 2.97 cSt |
| Specific Gravity @ 15° C. | | |
| ASTM D1298 | 0.806 g/cm$^3$ | 0.788 g/cm$^3$ |
| Composition, wt % | | |
| Linear paraffins | 51.0 | 14.0 |
| Branched paraffins | 28.0 | 76.8 |
| Alkyl cyclohexane | 9.2 | 5.5 |
| Alkyl benzene | 2.2 | 0.6 |
| Olefins | 2.7 | 0.3 |
| Acids | 0.2 | Not Detected* |
| Others | 6.7 | 2.8 |
| Degree of saturation | | |
| ASTM D1959-97 | 0.6 | 0.8 |

*Detection limit of 0.1 wt %

The diesel product from Stage 2 exhibited a poorer lubricity (502 μm) as compared to that of the organic phase from Stage 1 (352 μm). Without wishing to be bound by any theory, it is believed that the increase in ratio of branched to linear paraffins in the diesel product from Stage 2, as compared to the organic phase from Stage 1, resulted in a change of fuel properties.

Example 2

Production of Diesel from Soybean Oil

Refined soybean oil was fed to a fixed-bed reactor packed with a granulated 1.5 wt % Pt/SAPO-11 catalyst operated at an LHSV of 1.0 h$^{-1}$, 370° C., 40 atm, and an H$_2$/oil ratio of 1000 NL/L. The run was carried out for >250 hours. The gas phase contained, besides hydrogen, carbon dioxide and propane. The total liquid product was separated into two phases, water and an organic phase. The organic phase was further separated into light (<150° C.) and heavy (diesel product) fractions. The diesel product was analyzed according to ASTM methods. The results can be found in Table 4.

TABLE 4

| | Example 2 |
|---|---|
| Oil | Soybean |
| Temperature | 370° C. |
| Catalyst | Granulated 1.5 wt % Pt/SAPO-11 |
| LHSV, hr$^{-1}$ | 1.0 |
| Pressure, atm | 40 |
| H$_2$/oil ratio, NL/L | 1000 |
| Distillation Temperature ASTM D86 | |
| IBP | 223.2° C. |
| 10% | 284.1° C. |
| 50% | 296.5° C. |
| 90% | 337.7° C. |
| 95% | 367.9° C. |
| Full Boiling Point | 374.0° C. |
| Up to 250° C. | 1.2% |
| Up to 350° C. | 92.3% |
| Cold Filter Plugging Point (CFPP) | |
| IP 309 | −4° C. (+/−2.5) |

TABLE 4-continued

| | Example 2 |
|---|---|
| Lubricity (HFRR) | |
| ISO 12156/1 | 188 μm |
| Cetane Index | |
| ASTM D4737 | >65 |
| Flash Point Penski-Martens | |
| ASTM D93/A | 108.5° C. (+/_5%) |
| Cloud Point | |
| ASTM D2500 | 4° C. |
| Kinematic Viscosity @ 40° C. | |
| ASTM D445 | 4.36 cSt |
| Specific Gravity @ 15° C. | |
| ASTM D1298 | 0.7994 g/cm³ (+/_0.0009) |
| Copper Corrosion | |
| ASTM D130 | 1-a |

Preferably, the diesel fuel compositions of the present invention have cetane indices of greater than 60, as measured by ASTM D4737, and cetane numbers of greater than 60, as measured by ASTM D613 or D6890. Chemical analysis of the diesel product conducted by GC-MS yielded 30 wt % normal $C_{14}$ to $C_{18}$ paraffins, 55 wt % isoparaffins, 10 wt % aromatics, and 5 wt % olefins. Emission tests were carried out in a 2 L standard Ford diesel engine over a range of engine speeds (1200-2200 RPM) using the diesel product of Example 2 and a commercial crude diesel. While the torque (moment) and fuel consumption were similar for the diesel product of Example 2 and the commercial crude diesel, the emissions of the diesel product of Example 2 produced about 25% less $NO_x$, about 50% less hydrocarbons (HC), and about 40% less CO than the emissions of the commercial crude diesel. The smoke level was about the same.

Example 3

Production of Diesel from Soybean Oil

Refined soybean oil was fed to a fixed-bed reactor packed with a granulated 1 wt % Pt/SAPO-11 catalyst operated at an LHSV of 1.0 $h^{-1}$, 375-390° C., 30 atm, and an $H_2$/oil ratio of 1200 NL/L. The total liquid products were each separated into two phases, water and an organic phase. The organic phases were further separated into light (<150° C.) and heavy (diesel product) fractions. The light fractions contained, besides hydrogen, carbon oxides and $C_1$ to $C_4$ hydrocarbons. The diesel products were analyzed according to ASTM methods and the composition of the diesel products were measured by GC-MS and confirmed by NMR. The results can be found in Table 5.

TABLE 5

| | Example 3A | Example 3B | Example 3C |
|---|---|---|---|
| Oil | Soybean | Soybean | Soybean |
| Temperature | 375° C. | 385° C. | 390° C. |
| Catalyst | Granulated 1 wt % Pt/ SAPO-11 | Granulated 1 wt % Pt/ SAPO-11 | Granulated 1 wt % Pt/ SAPO-11 |
| LHSV, $hr^{-1}$ | 1.0 | 1.0 | 1.0 |
| Pressure, atm | 30 | 30 | 30 |
| $H_2$/oil ratio, NL/L | 1200 | 1200 | 1200 |
| Distillation Temperature ASTM D86 | | | |
| IBP | 208.1° C. | 190.3° C. | 186.8° C. |
| 10% | 291.3° C. | 272.5° C. | 266.1° C. |
| 50% | 294.6° C. | 293.2° C. | 298.1° C. |
| 90% | 326.7° C. | 332.9° C. | 360.3° C. |
| Up to 250° C. | 1.9% | 3.1% | 4.9% |
| Up to 350° C. | 92.1% | 91.8% | 89.0% |
| Cold Filter Plugging Point (CFPP) | | | |
| IP 309 | −15° C. | −8° C. | −20° C. |
| Lubricity (HFRR) | | | |
| ISO 12156/1 | 369 μm | 313 μm | 173 μm |
| Cloud Point | | | |
| ASTM D2500 | −11° C. | −3° C. | −16° C. |
| Kinematic Viscosity @ 40° C. | | | |
| ASTM D445 | 4.03 cSt | 3.72 cSt | 3.76 cSt |
| Specific Gravity @ 15° C. | | | |
| ASTM D1298 | 0.794 g/cm³ | 0.788 g/cm³ | 0.808 g/cm³ |
| Composition, wt % | | | |
| Linear paraffins | 23.6 | 30.4 | 14.5 |
| Branched paraffins | 61.5 | 54.4 | 52.9 |
| Alkyl cyclohexane | 7.8 | 4.8 | 9.0 |
| Alkyl benzene | 5.1 | 3.8 | 15.0 |
| Olefins | 1.4 | 1.6 | 3.0 |
| Acids | 0.2 | 0.2 | 0.3 |
| Others | 0.4 | 4.8 | 5.3 |

TABLE 5-continued

|  | Example 3A | Example 3B | Example 3C |
|---|---|---|---|
| Degree of saturation | | | |
| ASTM D1959-97 | 0.7 | 0.6 | 0.4 |

In addition to the characteristics found in Table 5, the cetane index according to ASTM D4737 of the diesel product of Example 3B was >65 and the diesel product of Example 3C has a Flash Point Penski-Martins according to ASTM D93/A of 108° C., a copper corrosion according to ASTM D130 of 1-a, and a lower heating value according to ASTM D240 of 46.7 MJ/kg.

Comparative Example 4

Production of Diesel from Soybean Oil by a Two Stage Process

Refined soybean oil was fed to a fixed-bed reactor packed with a granulated 1 wt % Pt/SAPO-11 catalyst operated at an LHSV of 1.0 h$^{-1}$, 380° C., 20 atm, and an H$_2$/oil ratio of 1200 NL/L (Stage 1). The total liquid product was separated into two phases, water and diesel product. The diesel product from Stage 1 was fed to a fixed-bed reactor packed with a granulated 1 wt % Pt/SAPO-11 catalyst operated at an LHSV of 4.5 h$^{-1}$, 360° C., 30 atm, and an H$_2$/oil ratio of 1200 NL/L (Stage 2). The diesel product from Stage 1 and the diesel product from Stage 2 were analyzed according to ASTM methods and their compositions were measured by GC-MS and confirmed by NMR. The results can be found in Table 6.

TABLE 6

|  | Comparative Example 4 Stage 1 | Comparative Example 4 Stage 2 |
|---|---|---|
| Oil | Soybean | Soybean |
| Temperature | 380° C. | 360° C. |
| Catalyst | Granulated 1 wt % Pt/SAPO-11 | Granulated 1 wt % Pt/SAPO-11 |
| LHSV, hr$^{-1}$ | 1.0 | 4.5 |
| Pressure, atm | 20 | 30 |
| H$_2$/oil ratio, NL/L | 1200 | 1200 |
| Distillation Temperature ASTM D86 | | |
| IBP | 181.3° C. | 189.7° C. |
| 10% | 263.9° C. | 263.5° C. |
| 50% | 292.5° C. | 292.6° C. |
| 90% | 360.3° C. | 353.7° C. |
| Up to 250° C. | 5.6% | 5.4% |
| Up to 350° C. | 88.9% | 89.7% |
| Cold Filter Plugging Point (CFPP) | | |
| IP 309 | −14° C. | −17° C. |
| Lubricity (HFRR) | | |
| ISO 12156/1 | 306 μm | 437 μm |
| Cloud Point | | |
| ASTM D2500 | −12° C. | −14° C. |
| Kinematic Viscosity @ 40° C. | | |
| ASTM D445 | 3.82 cSt | 3.60 cSt |
| Specific Gravity @ 15° C. | | |
| ASTM D1298 | 0.789 g/cm$^3$ | 0.794 g/cm$^3$ |

TABLE 6-continued

|  | Comparative Example 4 Stage 1 | Comparative Example 4 Stage 2 |
|---|---|---|
| Composition, wt % | | |
| Linear paraffins | 26.8 | 23.6 |
| Branched paraffins | 52.3 | 58.4 |
| Alkyl cyclohexane | 4.9 | 8.1 |
| Alkyl benzene | 7.7 | 2.9 |
| Olefins | 2.9 | 2.9 |
| Acids | 0.4 | Not Detected* |
| Others | 5.0 | 4.1 |
| Degree of saturation | | |
| ASTM D1959-97 | 0.4 | 0.5 |

*Detection limit of 0.1 wt %

The diesel product from Stage 1 exhibited acceptable properties, including a lubricity of 306 μm, similar to the diesel products of Example 2 and Example 3. As the composition of the diesel product from Stage 2 did not significantly differ from the diesel product from Stage 1, the properties of the diesel product from Stage 2 are similar to those of the diesel product from Stage 1. However, the diesel product from Stage 2 exhibited a poorer lubricity (437 μm) as compared to that of the diesel product from Stage 1 (306 μm), similar to the diesel production from Stage 2 of Comparative Example 1. Without wishing to be bound by any theory, it is believed that water may act as an inhibitor to isomerization, which requires higher catalyst activity, and the removal of water between Stage 1 and Stage 2 in Comparative Example 1 and Comparative Example 4 may also remove acid, thereby affecting final product lubricity.

Adding 0.1 wt % of oleic acid to the diesel product of Stage 2 improved its lubricity from 437 μm to 270 μm. Thus, as noted above, without wishing to be bound by any theory, it is believed that the low content of one or more oxygenated compounds, such as one or more fatty acids, in the product of the single stage process may contribute to the acceptable lubricity of the diesel product.

Example 5

Production of Diesel from Soybean Oil

Refined soybean oil was fed to a fixed-bed reactor packed with a granulated 1 wt % Pt/SAPO-11 catalyst operated at an LHSV of 1.0 h$^{-1}$, 375-390° C., and an H$_2$/oil ratio of 1200 NL/L. The pressure was 30 atm in Example 5A and 20 atm in Example 5B. The total liquid products were each separated into two phases, water and an organic phase. The organic phases were further separated into light (<150° C.) and heavy (diesel product) fractions. The light fractions contained, besides hydrogen, carbon oxides and C$_1$ to C$_4$ hydrocarbons. The diesel products were analyzed according to ASTM methods and the composition of the diesel products were measured by GC-MS and confirmed by NMR. The results can be found in Table 7.

TABLE 7

|  | Example 5A | Example 5B |
|---|---|---|
| Oil | Soybean | Soybean |
| Temperature | 380° C. | 385° C. |
| Catalyst | Granulated 1 wt % Pt/SAPO-11 | Granulated 1 wt % Pt/SAPO-11 |
| LHSV, hr$^{-1}$ | 1.0 | 1.0 |
| Pressure, atm | 30 | 20 |
| H$_2$/oil ratio, NL/L | 1200 | 1200 |
| Distillation Temperature ASTM D86 | | |
| IBP | 192.0° C. | 228.0° C. |
| 10% | 272.5° C. | 280.2° C. |
| 50% | 292.0° C. | 293.7° C. |
| 90% | 322.1° C. | 321.0° C. |
| Up to 250° C. | 2.6% | 1.1% |
| Up to 350° C. | 92.9% | 92.7% |
| Cold Filter Plugging Point (CFPP) IP 309 | -9° C. | -5° C. |
| Lubricity (HFRR) ISO 12156/1 | 186 μm | 283 μm |
| Cloud Point ASTM D2500 | -5° C. | -1° C. |
| Kinematic Viscosity @ 40° C. ASTM D445 | 3.76 cSt | 3.91 cSt |
| Specific Gravity @ 15° C. ASTM D1298 | 0.786 g/cm$^3$ | 0.785 g/cm$^3$ |
| Composition, wt % | | |
| Linear paraffins | 29.5 | 34.6 |
| Branched paraffins | 53.0 | 46.4 |
| Alkyl cyclohexane | 4.3 | 4.5 |
| Alkyl benzene | 6.2 | 2.2 |
| Olefins | 2.8 | 6.3 |
| Acids | 0.3 | 0.2 |
| Others | 3.9 | 5.8 |
| Degree of saturation | 0.5 | 0.6 |

Emission tests were carried out in a 2 L standard Ford diesel engine over a range of engine speeds (1200-2200 RPM) using the diesel products of Example 5A and Example 5B and a commercial crude diesel. A comparison of the data from the tests can be found in Table 8.

TABLE 8

|  | Example 5A | Example 5B | Commercial Crude Diesel |
|---|---|---|---|
| 1200 RPM | | | |
| Feed rate, g/min | 50 | 46 | 50 |
| Moment, Nm | 101 | 95 | 107 |
| Emission composition | | | |
| % CO | 0.028 | 0.018 | 0.036 |
| HC, ppm | 36 | 38 | 28 |
| NO$_x$, ppm | 366 | 315 | 390 |
| 1500 RPM | | | |
| Feed rate, g/min | 72 | 66 | 72 |
| Moment, Nm | 118 | 112 | 125 |
| Emission composition | | | |
| % CO | 0.035 | 0.021 | 0.043 |
| HC, ppm | 42 | 31 | 38 |
| NO$_x$, ppm | 438 | 418 | 490 |
| 1800 RPM | | | |
| Feed rate, g/min | 90 | 84 | 92 |
| Moment, Nm | 122 | 117 | 132 |
| Emission composition | | | |
| % CO | 0.035 | 0.018 | 0.057 |
| HC, ppm | 44 | 25 | 34 |
| NO$_x$, ppm | 360 | 422 | 500 |
| 2000 RPM | | | |
| Feed rate, g/min | 92 | 86 | 108 |
| Moment, Nm | 107 | 107 | 113 |
| Emission composition | | | |
| % CO | 0.033 | 0.013 | 0.035 |
| HC, ppm | 44 | 22 | 32 |
| NO$_x$, ppm | 360 | 395 | 480 |
| 2200 RPM | | | |
| Feed rate, g/min | 94 | 92 | 102 |
| Moment, Nm | 96 | 96 | 104 |
| Emission composition | | | |
| % CO | 0.035 | 0.013 | 0.028 |
| HC, ppm | 35 | 18 | 23 |
| NO$_x$, ppm | 334 | 372 | 460 |

While the torque (moment) and fuel consumption were similar for the three tested fuels, NO$_x$ emissions were lower for the diesel produced of Example 5A and Example 5B, as compared to the commercial crude diesel. Thus, the diesel product preferably exhibits on average less, preferably at least 25% less, NO$_x$ emissions than commercial crude diesel.

Example 6

Production of Diesel from Various Vegetable Oils

Refined vegetable oils were fed to a fixed-bed reactor packed with a granulated 1 wt % Pt/SAPO-11 catalyst operated at an LHSV of 1.0 h$^{-1}$, 375-390° C., and an H$_2$/oil ratio of 1200 NL/L. The total liquid products were each separated into two phases, water and an organic phase. The organic phases were further separated into light (<150° C.) and heavy (diesel product) fractions. The light fractions contained, besides hydrogen, carbon oxides and C$_1$ to C$_4$ hydrocarbons. The diesel products were analyzed according to ASTM methods and their compositions were measured by GC-MS and confirmed by NMR. The results can be found in Table 9.

TABLE 9

| | Example 6A | Example 6B | Example 6C |
|---|---|---|---|
| Oil | Palm | Corn | Sunflower |
| Temperature | 385 | 385 | 385 |
| Catalyst | Granulated 1 wt % Pt/SAPO-11 | Granulated 1 wt % Pt/SAPO-11 | Granulated 1 wt % Pt/SAPO-11 |
| LHSV, hr$^{-1}$ | 1.0 | 1.0 | 1.0 |
| Pressure, atm | 30 | 40 | 40 |
| H$_2$/oil ratio, NL/L | 1200 | 1200 | 1200 |
| Distillation Temperature ASTM D86 | | | |
| IBP | 222.3° C. | 197.0° C. | 235.3° C. |
| 10% | 270.1° C. | 286.1° C. | 293.4° C. |
| 50% | 285.0° C. | 296.9° C. | 299.1° C. |
| 90% | 303.3° C. | 320.3° C. | 318.9° C. |
| Up to 250° C. | 1.7% | 0.9% | 0.7% |
| Up to 350° C. | 95.3% | 92.6% | 93.0% |
| Cold Filter Plugging Point (CFPP) | | | |
| IP 309 | −5° C. | 16° C. | 13° C. |
| Lubricity (HFRR) | | | |
| ISO 12156/1 | 266 μm | 214 μm | 275 μm |
| Cloud Point | | | |
| ASTM D2500 | −3° C. | 19° C. | 15° C. |
| Kinematic Viscosity @ 40° C. | | | |
| ASTM D445 | 3.44 cSt | 4.24 cSt | 4.28 cSt |
| Specific Gravity @ 15° C. | | | |
| ASTM D1298 | 0.779 g/cm$^3$ | 0.788 g/cm$^3$ | 0.785 g/cm$^3$ |
| Composition, wt % | | | |
| Linear paraffins | 40.1 | 59.6 | 53.4 |
| Branched paraffins | 52.5 | 30.9 | 33.3 |
| Alkyl cyclohexane | 3.0 | 4.6 | 4.7 |
| Alkyl benzene | 1.2 | 0.9 | 0.8 |
| Olefins | 1.1 | 1.3 | 0.8 |
| Acids | 0.2 | 0.16 | 0.12 |
| Others | 1.9 | 2.6 | 6.9 |
| Degree of saturation | 0.5 | 0.2 | 0.2 |

As noted above, the composition and characteristics of the produced diesel may be adjusted by varying the vegetable and/or animal oil starting product, process conditions, and catalyst used.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A process for producing a liquid fuel composition comprising:
   providing oil selected from the group consisting of vegetable oil, animal oil, and mixtures thereof, wherein said oil contains triglycerides of fatty acids; and
   hydrodeoxygenating and hydroisomerizing the oil in a single step to form a liquid product which contains two phases, an organic phase and water, and separating the water.

2. The process of claim 1, comprising conducting the hydrodeoxygenating and hydroisomerizing in a trickle-bed reactor.

3. The process of claim 2, wherein the reactor comprises a single catalyst.

4. The process of claim 1, wherein conditions of the hydrodeoxygenating and hydroisomerizing comprise:
   a liquid hourly space velocity of 0.5 to 5 hr$^{-1}$;
   a temperature of 300 to 450° C.;
   a pressure of 10 to 60 atm; and
   a H$_2$/oil ratio of 800 to 2000 NL/L.

5. The process of claim 1, wherein the hydrodeoxygenating and hydroisomerizing is carried out in the presence of a catalyst comprising an acidic component and a metal component.

6. The process of claim 5, wherein the metal component is selected from the group consisting of platinum and palladium and the acidic component is selected from the group consisting of amorphous silica alumina, fluorided alumina, ZSM-12, ZSM-21, ZSM-22, ZSM-23, ZSM-35, ZSM-38, ZSM-48, ZSM-57, SSZ-32, ferrierite, SAPO-11, SAPO-31, SAPO-41, MAPO-11, MAPO-31, Y zeolite, L zeolite, and beta zeolite.

7. The process of claim 6, wherein the catalyst is Pt/SAPO-11.

8. The process of claim 7, wherein the catalyst is 1 wt % Pt/SAPO-11.

9. The process of claim 1, wherein the vegetable oil is selected from the group consisting of soybean oil, palm oil, corn oil, sunflower oil, jatropha oil, balanites oil, rapeseed oil, colza oil, canola oil, tall oil, safflower oil, hempseed oil, olive oil, linseed oil, mustard oil, peanut oil, castor oil, coconut oil, and mixtures thereof.

10. The process of claim 1, wherein the vegetable oil is selected from the group consisting of soybean oil, palm oil, corn oil, sunflower oil, jatropha oil, balanites oil, and mixtures thereof.

11. The process of claim 1, wherein the animal oil is selected from the group consisting of lard oil, tallow oil, train oil, fish oil, and mixtures thereof.

12. An integrated process for producing a liquid fuel composition comprising:
hydrodeoxygenating and hydroisomerizing oil selected from the group consisting of vegetable oil, animal oil, and mixtures thereof, said oil containing triglycerides of fatty acids, to produce a liquid fuel composition and gaseous byproducts, in a single step in a single reactor; wherein said liquid composition contains two phases, an organic phase and water, and the conditions of the hydrodeoxygenating and hydroisomerizing comprise a H2/oil ratio in the range between 800 and 2000 NL/L;
separating the liquid fuel composition from gaseous by-products;
separating the water from the liquid fuel composition;
separating hydrogen from the gaseous by-products; and
recycling the hydrogen to the single reactor.

13. The process of claim 12, further comprising: separating naphtha from the liquid fuel composition; producing hydrogen by steam reforming the naphtha; and recycling the hydrogen to the single reactor.

14. The process of claim 1, further comprising:
isolating a diesel fuel composition.

15. The process of claim 1, wherein hydrodeoxygenating and hydroisomerizing the oil in a single step comprises inhibiting hydrocracking.

16. The process of claim 14, wherein the diesel fuel composition comprises:
a mixture of $C_{14}$ to $C_{18}$ paraffins having a ratio of iso to normal paraffins of 2 to 8; and
less than 5 ppm sulfur.

17. The process of claim 16, wherein the diesel fuel composition has a lubricity of less than 400 μm an according to ISO 12156/1.

18. The process of claim 16, wherein the diesel fuel composition has a lubricity of less than 300 μm an according to ISO 12156/1.

19. The process of claim 16, wherein the diesel fuel composition has a lubricity of less than 200 μm an according to ISO 12156/1.

20. The process of claim 16, wherein the diesel fuel composition further comprises one or more oxygenated compounds.

21. The process of claim 20, wherein the diesel fuel composition comprises less than or equal to 0.6 wt % of one or more oxygenated compounds.

22. The process of claim 20, wherein the one or more oxygenated compounds comprise one or more fatty acids.

23. The process of claim 22, wherein the diesel fuel composition comprises less than or equal to 0.4 wt % of one or more fatty acids.

24. The process of claim 16, wherein the diesel fuel composition is produced by hydrodeoxygenating and hydroisomerizing the oil in a single step.

25. The process of claim 16, wherein the diesel fuel composition has a cetane index of greater than 60, as measured by ASTM D4737.

26. The process of claim 16, wherein the diesel fuel composition exhibits on average less $NO_x$ emissions than commercial crude diesel.

27. The process of claim 26, wherein the diesel fuel composition exhibits on average at least 25% less $NO_x$ emissions than commercial crude diesel.

28. The process of claim 14, further comprising;
blending the diesel fuel composition with fuel selected from the group consisting of fuel produced from crude oil, synthetic fuel, biodiesel, and mixtures thereof.

29. A process according to claim 1, wherein conditions of the hydrodeoxygenating and hydroisomerizing comprise a $H_2$/oil ratio in the range between 800 and 2000 NL/L.

* * * * *

UNITED STATES PATENT AND TRADEMARK OFFICE
CERTIFICATE OF CORRECTION

PATENT NO. : 8,142,527 B2
APPLICATION NO. : 11/378322
DATED : March 27, 2012
INVENTOR(S) : Mordechay Herskowitz It is certified that error appears in the above-identified patent and that said Letters Patent is hereby corrected as shown below:

Column 17, line 38, in Claim 17, delete "an" after "400 μm"

Column 18, line 2, in Claim 18, delete "an" after "300 μm"

Column 18, line 5, in Claim 19, delete "an" after "200 μm"

Signed and Sealed this
Third Day of July, 2012

David J. Kappos
*Director of the United States Patent and Trademark Office*